United States Patent Office 3,463,619
Patented Aug. 26, 1969

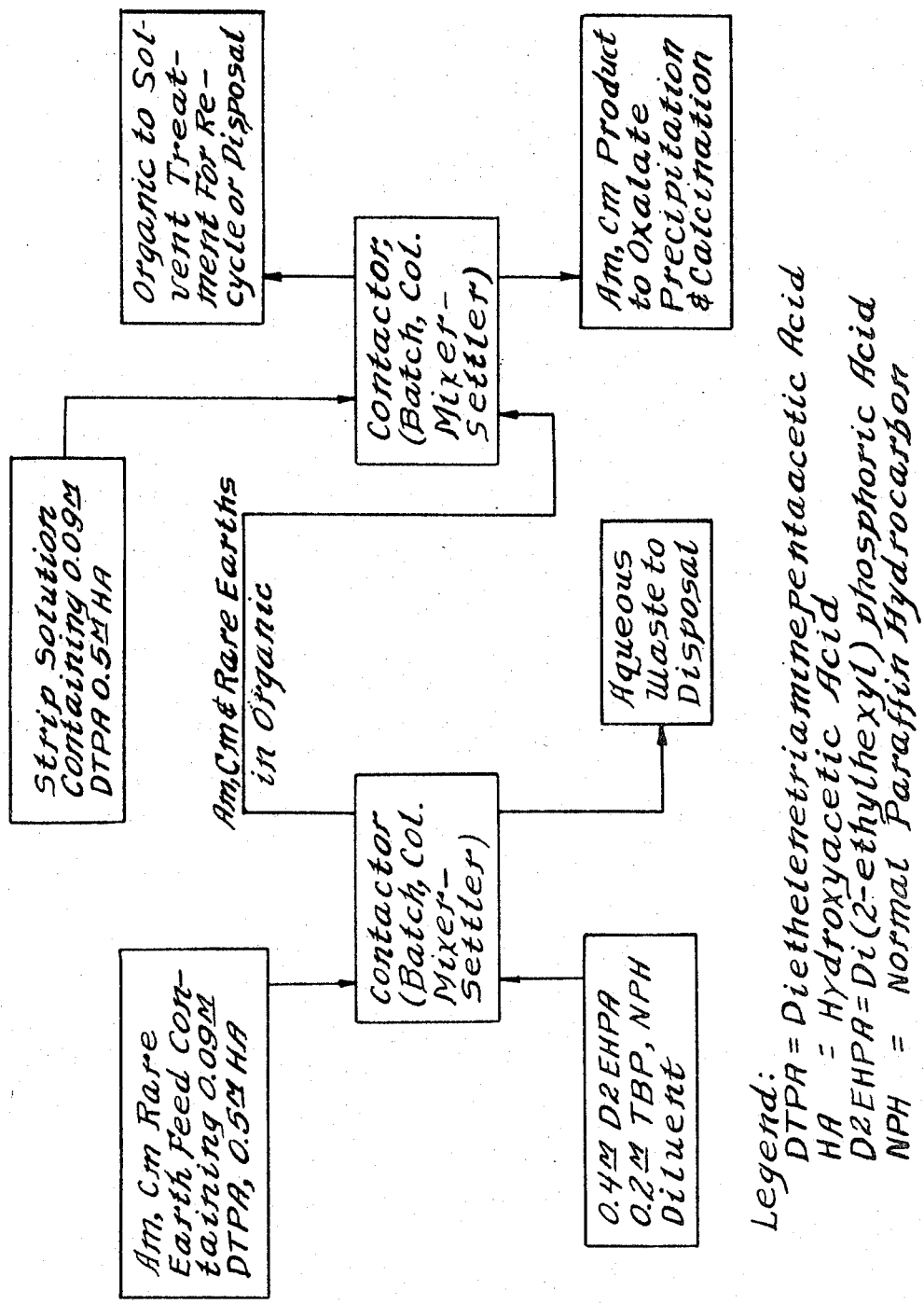

3,463,619
SOLVENT EXTRACTION PROCESS FOR PURIFYING AMERICIUM AND CURIUM
Gerald L. Ritter and Lane A. Bray, Richland, Wash., assignors to the United States of America as represented by the United States Atomic Energy Commission
Filed July 12, 1968, Ser. No. 744,353
Int. Cl. C01g 56/00
U.S. Cl. 23—341
8 Claims

ABSTRACT OF THE DISCLOSURE

A solvent extraction process for purifying americium and/or curium which is contained in an aqueous feed solution containing rare earths and other values by extracting the lanthanide rare earths, yttrium, uranium, americium and curium values present with di(2-ethylhexyl) phosphoric acid and tributyl phosphate in a normal paraffin hydrocarbon from the feed solution to which has been added hydroxyacetic acid and diethylenetriaminepentaacetic acid The americium and/or curium values are then separated from the lanthanide rare earths, yttrium, and uranium present and from the other elements, e.g. plutonium, which are extracted to a small extent by contacting the organic phase with an aqueous solution of hydroxyacetic acid and diethylenetriaminepentaacetic acid. The values are then recovered from the aqueous phase by precipitation with oxalic acid.

CONTRACTUAL ORIGIN OF THE INVENTION

The invention described herein was made in the course of, or under, a contract with the United States Atomic Energy Commission.

BACKGROUND OF THE INVENTION

This invention relates to a method of separating actinide rare earths from nuclear reactor fuel reprocessing waste solutions. More specifically, this invention relates to a method for purifying americium and/or curium which is contained in aqueous waste reprocessing solutions containing these, the lanthanide rare earths, yttrium, plutonium and uranium.

Several processes have been developed which utilize solvent extraction principles to separate americium and curium values from the lanthanide rare earths and other impurities normally found in reactor fuel reprocessing waste solutions. These impurities may include aluminum, iron, magnesium and nickel, among others.

Some of these solvent extraction processes require the presence of high concentrations of chloride ions in the aqueous phase. This necessitates the use of equipment constructed of corrosion-resistant materials. Since this equipment is expensive, the cost of recovering these values is increased considerably. Other problems due to chloride decomposition resulting from the high radioactivity are also present which decrease the desirability of this process.

Solvent extraction processes which eliminate the high chloride concentrations have been developed. In one of these processes an organic extractant in an expensive diluent is used to remove most of the rare earths, leaving the americium and curium in the aqueous phase. These values are then removed with a second organic extractant from which they may be recovered by stripping with an inorganic acid. Although this process is satisfactory, it does require the use of several rather expensive chemical compounds and additional extraction columns which increase recovery costs.

BRIEF DESCRIPTION OF THE DRAWING

The drawing shows a flow sheet of the process of this invention.

SUMMARY OF THE INVENTION

We have developed a process for the separation of americium and curium values from the lanthanide rare earths, yttrium, plutonium and uranium values which uses relatively inexpensive chemical reagents and requires less equipment than the prior art.

The process of this invention comprises the addition of diethylenetriamine pentaacetic acid (hereinafter referred to as DTPA) and hydroxyacetic acid to an aqueous feed solution containing the rare earths and other values. After adjusting the pH and nitrate ion content, the aqueous solution is contacted with a water-immiscible organic solution of di(2-ethylhexyl) phosphoric acid (hereinafter referred to as D2EHPA) and tributyl phosphate which extracts the rare earths and other values from the feed solution. The americium and curium are then separated from the other values by contacting the organic solution with an aqueous solution of DTPA and hydroxyacetic acid at an increased pH. The addition of oxalic acid to the aqueous solution will precipitate the americium and curium values as the oxalate which can then be calcined to form the oxide.

It is therefore one object of this invention to provide a solvent extraction method for separating americium and curium values from aqueous solutions containing these, the rare earths and other values.

It is another object of this invention to provide a solvent extraction method of separating americium and curium values from the rare earths and other values in which relatively inexpensive chemical compounds are used.

DESCRIPTION OF THE PREFERRED EMBODIMENT

These and other objects of the invention may be attained by adding 0.5 M hydroxyacetic acid and 0.09 M DTPA to the aqueous feed solution containing the rare earths and other values to complex the undesirable metal ions present and prevent their extraction. Nitrate ion is added if necessary to obtain a concentration of 3–4 molar and the pH is adjusted to from 1 to 1.2 before contacting the solution with an organic extractant containing 0.4 M D2EHPA and 0.2 M tributyl phosphate in a straight chain normal paraffin hydrocarbon. The americium, curium and any rare earths, yttrium, or uranium present are extracted by the organic solution and the aqueous solution may be either disposed of or recycled.

Separation of the americium and curium values from the rare earths and other values is accomplished by contacting the organic phase containing the rare earths with an aqueous solution of 0.5 M hydroxyacetic acid and 0.09 M DTPA at about pH 3.3, whereupon the americium and curium are taken up in the aqueous phase. Separation of the americium and curium from each other and from the aqueous solution may be done by techniqes well known to those skilled in the art. For example, the addition of sufficient oxalic acid to the aqueous solution will form americium and curium oxalate which precipitate out and may then be easily separated from the solution by filtering. The precipitate is then calcined to form the oxides of americium and curium.

After removal of the americium and curium values, the organic solution may be treated for reuse or disposed of as circumstances permit.

The amount of DTPA which must be added to the aqueous feed solution is dependent upon the quantity of metal cations, such as aluminum, iron, and nickel, present in the solution. In general, it was found that an excess of 0.05 M DTPA over the amount required to complex the metal cations present in the solution was adequate to obtain satisfactory results. Too high a concentration of DTPA is to be avoided, since americium distribution rates are affected.

Hydroxyacetic acid is necessary in the aqueous feed solution as a buffering agent and to prevent precipitation of the DTPA at the pH values used. It is found to be effective in any concentration from 0.1 to 1.0 M, with 0.5 M being preferred. Higher concentrations are generally to be avoided to keep the amount of effluent which must be disposed of as small as possible.

Distribution ratios are also affected by the pH of the aqueous feed solution. In general, a pH of 1 to 1.2 will extract cerium, lanthanum, yttrium, europium and uranium almost completely along with 91–95% of the americium present. NaOH was found to be satisfactory to adjust pH values, although other alkalis will work as well.

Contact times between the aqueous and organic phases also affect distribution ratios. Maximum americium distribution is attained within two minutes, while the ratios of aluminum, chromium, plutonium and iron increase slowly with increasing contact times. Thus it is important that contact times be no greater than two minutes in order to minimize extraction of the impurities.

The distribution ratio of americium is also found to be affected by the amount of nitrate ion present in the aqueous feed solution. Thus the distribution ratio of americium increases as the nitrate ion concentration is increased. Although americium recovery can be accomplished with a nitrate ion concentration of up to 7.0 M, a concentration of from 3 to 4 M is to be preferred, since higher concentrations affect the solubility of the other reagents present. The nitrate ion may be added in any form, for example, sodium nitrate or nitric acid.

The sodium salt of D2EHPA is used because the compound is washed with NaOH to remove minor impurities which are present. A concentration of from 0.1 to 0.6 M will satisfactorily extract the rare earths, although 0.4 M is preferred. Lower concentrations were found to affect distribution ratios and higher molarities will bring the specific gravity of the organic solution very close to the specific gravity of the aqueous solutions, resulting in the problem of disengagement of the two phases once contacting is completed.

Because the sodium form of D2EHPA is used, tributyl phosphate is necessary to promote solubility. Thus the concentration of tributyl phosphate is directly proportional to the D2EHPA present. A ratio of one to two moles tributyl phosphate to two moles D2EHPA is satisfactory.

A satisfactory water-immiscible organic diluent was found to be a straight chain normal paraffin hydrocarbon containing 10 to 14 carbon atoms, although other solvents, such as dodecane or kerosene, will also work.

The americium and curium values are separated from the organic extractant and from the rear earths and other values present by contacting the extractant with an aqueous solution containing DTPA and hydroxyacetic acid. The concentration of DTPA necessary is dependent upon and increases with the amount of D2EHPA present in the extractant. Thus, 0.09 M DTPA is satisfactory when the concentration of D2EHPA is 0.4 M. The preferred concentration of hydroxyacetic acid was found to be 0.5 M, although 0.1 to 1.0 M is also satisfactory. The pH of the aqueous solution after contact with the organic extractant is important in that it greatly affects americium and curium distribution ratios. The pH of the aqueous solution upon disengagement of the two phases should be from 3.0 to 4.0. Thus, the initial pH of the solution necessary to attain this final pH will be dependent upon the composition of the solutions and can be readily determined by those skilled in the art.

Distribution ratios were also found to be affected by the alkali used to adjust the aqueous strip solution. Although NaOH was used because of convenience in the examples given hereinafter, $NH_4OH$ was found to give slightly better americium and curium recoveries than the other alkalis.

Contact times between the aqueous and organic phases are again important. It was found that five to ten minutes of contact between the two phases was the best amount of time, since it permitted a maximum amount of americium and curium values to be stripped from the organic extractant, while limiting the amount of other rare earths recovered. Longer times may be required, however, depending upon the type of equipment which is to be used.

The following examples are given as an illustration of the process of this invention and are not to be taken as limiting the scope or extent of the invention. Although the contact times given in the examples are longer than the times hereinbefore given, the shorter times are preferred and will give improved separation results.

EXAMPLE I

A synthetic feed solution was made up having the following composition.

TABLE I.—AMERICIUM FEED COMPOSITION

| | |
|---|---|
| $Am^{+3}$ | Trace |
| $Al^{+3}$ | 0.02 M |
| $Fe^{+3}$ | 0.0097 |
| $Mg^{+2}$ | 0.0022 |
| $Pu^{+4}$ | Trace |
| $Ce^{+3}$ | 0.00008 |
| $Ga^{+3}$ | 0.00008 |
| $Ni^{+2}$ | 0.00009 |
| $Cr^{+3}$ | 0.00021 |
| $Ca^{+2}$ | 0.0027 |
| $UO_2^{+2}$ | 0.00018 |
| $Y^{+3}$ | 0.0006 |
| $Na^+$ | ~2.7 |
| $HC_2H_3O_3$ | 0.5 |
| DTPA | 0.089 |

The feed was adjusted to pH 1.15 with NaOH and contacted with a water-immiscible organic extractant consisting of 0.4 M D2EHPA and 0.2 M tributyl phosphate in a normal paraffin hydrocarbon diluent at a temperature of 25° C. After contact for 10 minutes, the following results were obtained.

TABLE II.—EXTRACTION DISTRIBUTION RATIOS

| | $E_a^0$ [1] | Percent of the cation in the organic after extraction |
|---|---|---|
| Al | 0.086 | 8 |
| Am | 20 | 95 |
| Ca | 0.5 | 30 |
| Ce | 37 | 98 |
| Cr | 0.062 | 5.8 |
| Eu | 200 | 100 |
| Fe | 0.003 | 0.3 |
| Ga | 0.0006 | 0.06 |
| La | 28 | 96.6 |
| Mg | 0.011 | 1 |
| Na | 0.0005 | 0.05 |
| Pu | 0.011 | 1 |
| U | 1,300 | 100 |
| Y | 2,884 | 100 |

[1] $E_a^0$ = the amount of ion in the organic phase divided by the ion in the aqueous phase.

The americium values were then stripped from the loaded organic with an aqueous solution containing 0.5 M hydroxyacetic acid and 0.089 M DTPA which was adjusted to pH 3.3 with NaOH. The organic to aqueous ratio was 4. Contact was for 10 minutes at 25° C. with a pH after disengagement of 3.27. The stripping results are given below in Table III.

TABLE III.—STRIPPING DISTRIBUTION RATIOS

| | $E_a^0$ | Percent of the extracted cation in strip |
|---|---|---|
| Al | 244 | <1 |
| Am | 0.081 | 75 |
| Ce | 10.6 | 2 |
| Cr | 625 | <1 |
| Mg | 3.2 | 7 |
| U | 2,108 | <0.1 |
| Y | 1,196 | <0.1 |

Although uranium and yttrium extracted completely into the organic solution, they were not readily stripped. Aluminum distribution ratios are more a function of contact time than pH and aluminum that does extract will strip out slowly or only in a caustic wash of the organic. If cerium or other rare earths are not found in the feed or if lower americium losses are required, the strip pH can be increased, thereby decreasing the americium lost or recycled with the solvent.

EXAMPLE II

A 20-ml. americium feed sample was added to 7.4 ml. of 19 M NaOH, 1.75 ml. of 11.5 M hydroxyacetic acid and 3 ml. of 1.05 M DTPA and adjusted to a final volume of 40 ml. at a pH of 1.10.

20 ml. of this aqueous phase was contacted for 10 minutes at 25° C. with a like amount of 0.4 M D2EHPA, 0.2 M tributyl phosphate and normal paraffin hydrocarbon. The final aqueous pH was 1.15 and the americium E. o/a was 10.1 (91% americium extracted).

16 ml. of the loaded organic was stripped with 4 ml. of a solution containing 0.5 M hydroxyacetate and 0.09 M DTPA, preadjusted to pH 3.87. After 10 minutes of contact, the final pH was 3.55 and the americium E o/a was 0.024 (91% americium stripped).

3 ml. of the americium strip solution was mixed with 3 ml. of 1 M oxalic acid to precipitate the americium. The americium loss to the centrifuged supernate (pH 1.2) was 1.35%.

Table IV below gives the results of this demonstration.

TABLE IV

|  | Initial feed (<6 wt. percent AM) | Final product (>94 wt. percent AM) | Actual DF [2] |
|---|---|---|---|
| Am-241 | 0.22 g./l. | 0.21 g./l. |  |
| Pu-239 | 8.4×10⁻³ g./l. | <6.3×10⁻⁶ g./l. | >1,000 |
| Al | >1,000 p.p.m.[1] | 1 p.p.m.[1] | >1,000 |
| Ca | >>1,000 | 5 | >200 |
| Cr | 50 | <2 | >25 |
| Fe | >1,000 | 2 | >500 |
| Mg | 100 | 5 | 20 |
| Ni | 100 |  |  |
| Ce | 10 (spiked) |  | 10 |
| Y | 10 |  |  |
| Ga | 10 |  |  |

[1] Parts per million parts solution as determined by an emission spectrograph analysis.
[2] Decontamination factor.

The original sample contained less than 6 w/o americium and the final product contained greater than 94 w/o americium. 80% of the americium was recovered in a single extraction (9% loss), strip (9.6% loss) and oxalate precipitate (1.1% loss).

It can be seen by the examples that excellent results have been obtained in recovering americium values from the rare earth values and other impurities present in nuclear reactor fuel waste reprocessing solutions. It should be pointed out that, although curium values were not included in either of the examples, these values will behave in the process the same as the americium values, from which they must then be separated.

It is obvious that changes may be made in the content of the aqueous and organic solutions and that additional steps may be added to the invention, such as, for example, extraction or stripping steps, without departing from the invention. Therefore, it will be understood that the invention is not to be limited to the details given herein but that it may be modified within the scope of the appended claims.

The embodiments of the invention in which an exclusive property or privilege is claimed are defined as follows:

1. A method of separating and recovering americium and curium values from an aqueous feed solution containing these and rare earth values which is at a pH between about 1 and about 1.2 comprising:

adding hydroxyacetic acid and diethylene triaminepentaacetic acid to said solution;

contacting the resulting solution with a substantially water-immiscible organic extractant comprising di-(2-ethylhexyl)phosphoric acid, and tributyl phosphate in an organic solvent;

separating the resulting organic mixture containing the rare earths, americium and curium from the aqueous solution;

contacting the organic mixture with an aqueous stripping solution comprising hydroxyacetic acid and diethylenetriaminepentaacetic acid which is at a pH between about 3 and about 4, whereby the americium and curium values are stripped from the organic solution; and recovering the americium and curium values from the aqueous stripping solution.

2. The method of claim 1 wherein 0.1 M to 1.0 M hydroxyacetic acid is added to said aqueous feed solution.

3. The method of claim 2 wherein sufficient diethylenetriaminepentaacetic acid is added to said feed solution to complex the metal cations present in addition to 0.05 M excess.

4. The method of claim 3 wherein the feed solution contains up to 7 M nitrate ions.

5. The method of claim 1 wherein the organic extractant contains 0.1 to 0.6 M di(2-ethylhexyl) phosphoric acid and sufficient tributyl phosphate to maintain a ratio of one to two moles tributyl phosphate to two moles di(2-ethylhexyl) phosphoric acid.

6. The method of claim 5 wherein the organic solvent is a straight chain normal paraffin hydrocarbon containing 10 to 14 carbon atoms.

7. The method of claim 1 wherein the aqueous stripping solution contains 0.1 to 1.0 M hydroxyacetic acid and 0.09 M diethylenetriaminepentaacetic acid.

8. The method of claim 1 wherein 0.5 M hydroxyacetic acid, 0.09 M diethylenetriaminepentaacetic acid are added to said feed solution and the pH adjusted to 1.2; the organic extractant consists of 0.2 M. tributyl phosphate and 0.4 M di(2-ethylhexyl) phosphoric acid in a normal paraffin hydrocarbon containing 10 to 14 carbon atoms and is contacted with the feed solution for two minutes; the stripping solution comprises 0.5 M hydroxyacetic acid and 0.09 M diethylenetriaminepentaacetic acid at a pH of 4–4.5 and is contacted with the organic extractant for five to ten minutes.

References Cited

UNITED STATES PATENTS

| 3,378,352 | 4/1968 | Hansen | 23—341 |
| 3,230,036 | 1/1966 | Kappelmann et al. | 23—341 |
| 3,022,134 | 1/1962 | Fields et al. | 23—341 |
| 3,004,823 | 10/1961 | Peppard et al. | 23—341 |

CARL D. QUARFORTH, Primary Examiner

M. J. McGREAL, Assistant Examiner

U.S. Cl. X.R.

23—343; 260—429.1, 429.2